Patented Nov. 17, 1942

2,302,463

UNITED STATES PATENT OFFICE 2,302,463

PROCESS OF OXIDIZING MENTHANES

Robert C. Palmer, Carlisle H. Bibb, and William T. McDuffee, Jr., Pensacola, Fla., assignors to Newport Industries, Inc., Pensacola, Fla., a corporation of Delaware No Drawing. Application November 6, 1939, Serial No. 303,027

7 Claims. (Cl. 260—514)

This invention relates to a process of oxidizing menthanes and to the products produced thereby. More particularly, the invention relates to the catalytic oxidation of menthanes in the liquid phase by means of molecular oxygen in the presence of an oxidizing catalyst. The products of oxidation include alcohols, aldehydes, ketones, oxides and acids. The non-acid products are useful as substitutes for pine oil, while the acids may be used in place of benzoic and naphthenic acids in numerous instances.

It is therefore an important object of this invention to provide an efficient process for the catalytic oxidation of menthanes in liquid phase.

It is a further important object of this invention to provide a process for the catalytic oxidation of para-menthane, either by itself or in admixture with cymene, to produce a mixture of alcohols, aldehydes, ketones, oxides and acids, from which non-acid products can be separated for use as substitutes for pine oil and the acids may be recovered for manufacture into petroleum soluble drier metal soaps for the paint and varnish industry.

It is a further important object of this invention to provide a novel composition of matter comprising a mixture of alcohols, aldehydes, ketones and oxides obtainable by the catalytic oxidation of menthanes, such as para-menthane, or a mixture of para-menthane and cymene.

It is a further important object of this invention to provide a novel composition of matter comprising mixtures of hexa-hydro cumic and hexa-hydro toluic acids, obtainable by the catalytic oxidation of para-menthane.

Other and further important objects of this invention will become apparent from the following description and appended claims.

The starting material for our process is a menthane, such as ortho-, para- or meta-menthane, or a mixture containing a menthane. A mixture such as that obtained by the hydrogenation of mono-cyclic terpenes or by the disproportionation of such terpenes, comprising para-menthane and cymene, is very suitable for our purpose.

Oxidation catalysts that have been found most satisfactory belong to the group of oxides and hydroxides of the heavy metals, and their organic salts. Such oxygen containing compounds of the heavy metals may be used either by themselves or in admixture with each other. Mixtures of manganese and lead acetates, benzoates, or cumates are examples of mixed catalysts that have been found highly effective. However, the hydrates, oxides or organic salts of any of the various so-called heavy metals, such as manganese, copper, cobalt, iron, lead, nickel, molybdenum, vanadium, silver, chromium and mercury, can be added to the charge to produce catalytic activity. Some metals are more effective than others.

In the preparation of a specific catalytic mixture, such as that of manganese and lead acetate, such a mixture can be conveniently made by fusing together 1 part of lead acetate containing 3 moles of water with 2 parts of manganese acetate containing 4 moles of water. The fusion is carried out, for instance, at a temperature of about 130° C. until all of the water has been driven off and an anhydrous, solid mass is obtained. This solid mass is then pulverized and the powdered mixture used as a catalyst. The particular ratio of manganese to lead is not important, since either of these two metals is itself catalytically active.

The following example will serve to illustrate a preferred embodiment of our invention:

160 gallons of para-menthane are put in a vessel having a device for passing air or oxygen into the charge. The spent air or other gas then goes through a reflux cooler, from which any oil entrained in the gases is returned to the oxidizing vessel and the fixed gases are vented to the atmosphere. About 20 lbs. of a powdered mixture of lead and manganese acetate, prepared as above described, are added to the charge of para-menthane and the oil and catalyst are agitated and heated to about 100° C., while air is being blown through the charge in a fine state of subdivision at the rate of about 20 cu. ft. per minute for a period of about 25 hours. There is thus produced about 150 gallons of oxidized oil. This oil is then fractionally distilled under vacuum to yield:

| | Gallons |
|---|---|
| Unreacted para-menthane | 76 |
| Oil consisting of a mixture of alcohols, aldehydes, oxides and ketones | 32 |
| Residue, testing 51% of a mixture of hexa-hydro cumic and hexa-hydro toluic acid | 35 |

Further distillation of the residue without a fractionating column yields the acids as a distillate in a slightly yellow colored, impure state. This impure mixture of acids may be purified by redistillation and/or by recrystallization from para-menthane, or other solvents, at a suitable temperature. Other methods of recovery of the acids may be used without departing from this invention. For example, the acids can easily be washed out of the crude oxidized oil by extraction with a weak caustic soda solution of, say, 6% concentration. The alkaline extract is then made acid with hydrochloric acid, whereupon the organic acids are precipitated and can subsequently be refined by well-known methods of organic acid purification.

The temperature of 100° C. given in the foregoing example is not critical, since higher temperatures may be used, such as up to 140° C., or lower temperatures, as low as 70° or even ordinary room temperatures, may be used. With the lower temperatures, the reaction becomes slower.

Other changes in the procedure may be made by those skilled in the art. More or less air may be used, but if less air is employed, the oxidation does not go so far and therefore less acid is produced in relation to the alcohols and ketones, and less para-methane is attached.

When other menthanes than the para-compound are oxidized by this method, the corresponding oxygenated products are produced. In the case of para-menthane, the oxygen attacks the tertiary carbon atom of the isopropyl side chain, forming dihydro terpineol, which may be further oxidized to the ketone and formaldehyde. At the same time, oxides are also produced, the latter being capable of isolation as an intermediate fraction between the recovered para-menthane and the alcohols and ketones, when the crude oxidized product is fractionally distilled.

Instead of starting with para-menthane itself, a mixture of para-menthane and cymene, such as that obtained as the reaction product of the disproportionation of dipentene and/or other mono-cyclic terpene hydrocarbons, may be used. Such a reaction product comprises substantially 33% of para-menthane and 66% of cymene. When oxidized in accordance with the foregoing method, the para-menthane as well as the cymene is converted into oxidation products, forming a mixture consisting of the oxygen derivatives of both hydrocarbons, from which mixture the oxidation products can be recovered in accordance with the foregoing example.

The mixture of alcohols, aldehydes, ketones and oxides, derived from the oxidation of a mixture of para-menthane and cymene, has been found to be of value as a substitute for pine oil, which it in many ways resembles. For example, this mixture forms clear concentrated solutions with soaps and water that give relatively stable emulsions on dilution, which have wetting-out properties equal to similar pine oil compounds. Also, its germicidal power is of the same order as that of steam distilled pine oils. It further is a good solvent for resins and oils, thus adapting it for use in surface coating compositions.

In general, a mixture of alcohols, aldehydes, ketones and oxides, such as obtained by the oxidation of a menthane, or of a para-menthane and cymene, will have physical properties such as the following:

Sp. gr. at 15.5° C. from 0.94 to 0.99
B. pt. at 760 m. m. from 175° to 240° C.
Index of refraction, $D_{20°}$ from 1.49 to 1.54

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. In the process of preparing hexa-hydro cumic and hexa-hydro toluic acids from para-menthane, the steps of reacting para-menthane in liquid phase with molecular oxygen at temperatures not exceeding 140° C. in the presence of a catalytically active heavy metal compound as the sole catalyst present until a substantial conversion of said para-menthane into alcohols, aldehydes, ketones, oxides and acids has been effected, washing the resulting oxidation reaction mass with an aqueous alkaline solution to extract the acids therefrom, and separating said acids from the aqueous alkaline extract.

2. In the process of preparing hexa-hydro cumic and hexa-hydro toluic acids from para-menthane, the steps of reacting para-menthane in liquid phase with molecular oxygen at temperatures not exceeding 140° C. in the presence of a catalytically active heavy metal compound as the sole catalyst present until a substantial conversion of said para-menthane into alcohols, aldehydes, ketones, oxides and acids has been effected, washing the resulting oxidation reaction mass with an aqueous alkaline solution to extract the acids therefrom, and acidifying said aqueous alkaline extract to liberate hexa-hydro cumic and hexa-hydro toluic acids therefrom.

3. The process of preparing oxidation products of a menthane, which comprises subjecting a menthane in liquid phase to the action of molecular oxygen at temperatures up to 140° C. in the presence of an oxidation catalyst selected from the group consisting of oxides, hydroxides and carboxylic acid salts of heavy metals until there is produced a mixture of alcohols, aldehydes, ketones, oxides, acids and unreacted menthane.

4. The process of preparing oxidation products of a menthane, which comprises subjecting a menthane in liquid phase to the action of molecular oxygen at temperatures up to 140° C. in the presence of an oxidation catalyst selected from the group consisting of oxides, hydroxides and carboxylic acid salts of heavy metals until there is produced a mixture of alcohols, aldehydes, ketones, oxides, acids and unreacted menthane and recovering said acids separate from said mixture.

5. The process of preparing oxidation products of para-menthane, which comprises subjecting para-menthane in liquid phase to the action of molecular oxygen at temperatures up to 140° C. in the presence of an oxidation catalyst selected from the group consisting of oxides, hydroxides and carboxylic acid salts of heavy metals until a substantial conversion of said para-menthane into alcohols, aldehydes, ketones, oxides and hexa-hydro cumic and hexa-hydro toluic acids has been effected, and recovering said acids.

6. The process of preparing oxidation products of para-menthane, which comprises subjecting para-menthane in liquid phase to the action of molecular oxygen at temperatures up to 140° C. in the presence of an oxidation catalyst containing mixed lead and manganese compounds selected from the group consisting of oxides, hydroxides and carboxylic acid salts of said lead and manganese until a substantial conversion of said para-menthane into alcohols, aldehydes, ketones, oxides and hexa-hydro cumic and hexa-hydro toluic acids has been effected, and recovering said acids.

7. The process of preparing oxidation products of para-menthane, which comprises subjecting para-menthane in liquid phase to the action of molecular oxygen at temperatures up to 140° C. in the presence of an oxidation catalyst consisting essentially of a mixture of lead and manganese acetates until a substantial conversion of said para-menthane into alcohols, aldehydes, ketones, oxides and hexa-hydro cumic and hexa-hydro toluic acids has been effected, and recovering said acids.

ROBERT C. PALMER.
CARLISLE H. BIBB.
WILLIAM T. McDUFFEE, Jr.